United States Patent Office 3,344,178
Patented Sept. 26, 1967

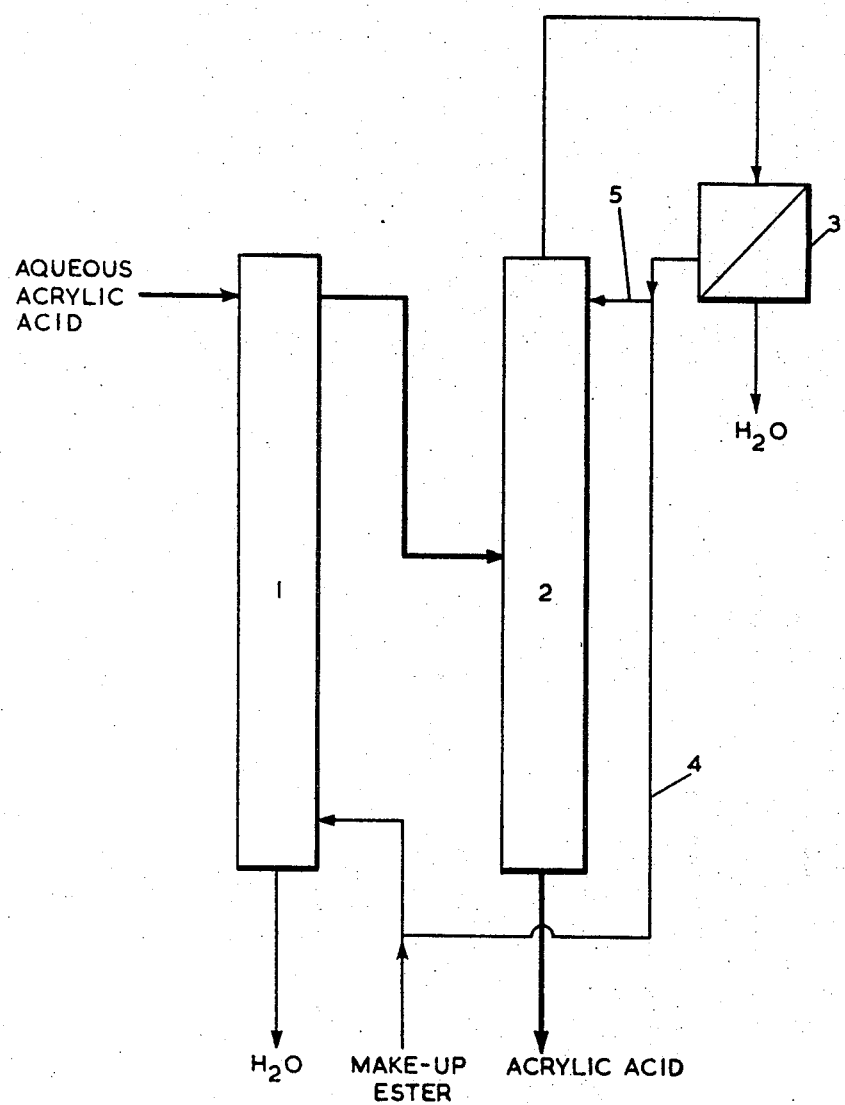

3,344,178
ACRYLIC ACID CONCENTRATION BY EXTRACTION AND DISTILLATION WITH A SOLVENT-ENTRAINER
Christopher John Brown, Walton-on-the-Hill, and Frank Christopher Newman, Great Bookham, Surrey, England, assignors to The Distillers Company Limited, Edinburgh, Scotland, a British company
Filed May 11, 1964, Ser. No. 366,280
Claims priority, application Great Britain, May 16, 1963, 19,421/63
9 Claims. (Cl. 260—526)

The present invention relates to the concentration of acrylic acid.

Dilute aqueous solutions of acrylic acid are obtained for instance, by the catalytic vapour phase oxidation of propylene or acrolein in the presence of steam and cooling the effluent gases to condense out the aqueous acrylic acid so produced. Most of the uses for which acrylic acid is required, for example esterification, need a concentrated acrylic acid. The concentration of the dilute aqueous acid, e.g. a 20% solution of acrylic acid in water, by simple fractional distillation is not possible owing to the volatility of acrylic acid in the presence of water.

It has now been discovered that dry concentrated acrylic acid can be obtained from dilute aqueous acrylic acid solutions by a combination of solvent extraction and fractional distillation steps.

According to the present invention the process for the concentration of aqueous acrylic acid solutions comprises extracting the aqueous acrylic acid with ethyl acrylate or ethyl acetate whereby the acrylic acid is extracted into the ester phase, fractionally distilling the ester phase to separate the ester as an overhead azeotropic fraction with substantially all of the water, recovering dry, concentrated acrylic acid from the base of the column and maintaining sufficient ester in the column to ensure that substantially all of the water is removed in the overhead fraction.

The dilute aqueous acrylic acid used as starting material in the process of the present invention suitably contains about 10 to 30% by weight of acrylic acid and preferably about 15 to 25%. The extraction stage is preferably carried out in a counter-current manner, using ethyl acetate or ethyl acrylate as extractant. The aqueous acrylic acid is suitably fed in at the top of an extraction column or tower, while the ester phase is introduced at the bottom. Ester phase containing dissolved acrylic acid and some water is withdrawn from the top of the column, and a residual water phase is withdrawn from the bottom.

The ester phase containing dissolved acrylic acid and some water is fed to an intermediate point in a distillation column in which the ester is separated as an overhead fraction in the form of its water azeotrope, while dry acrylic acid is recovered as residue from the base of the column. It is necessary to return the ester to the column as reflux to ensure that substantially all of the water is removed in the overhead fraction. This is suitably carried out by condensing the overhead fraction and allowing this to separate into two phases of which the aqueous phase is discarded and part of the ester phase is returned to the top of the column as reflux. Suitably the remainder of the ester phase is recycled to the extraction column.

When acrylic acid is prepared by the catalytic vapour phase oxidation of propylene, one of the major by-products is acetic acid, ang the dilute aqueous acid mixture obtained by cooling of the effluent gases can also be concentrated by the process of this invention to give a mixture of dry acrylic and acetic acids.

The process of the present invention is further illustrated with reference to the accompanying drawing in the form of a flow diagram.

Dilute aqueous acrylic acid solution containing about 20% by weight of acrylic acid in water is extracted countercurrently with ethyl acetate in extraction column 1, the acrylic acid solution being fed in at the top of the column and the ethyl acetate at the bottom of the column. The ester phase containing dissolved acrylic acid and about 11% of water is withdrawn from the top of the extraction column and fed to an intermediate point in the distillation column 2; residual water is withdrawn from the bottom of the extraction column 1. In the distillation column 2 the ethyl acetate/acrylic acid/water mixture is separated into an overhead fraction containing the ethyl acetate and substantially all of the water, and a residue fraction consisting of dry glacial acrylic acid. The overhead fraction is passed through a condenser into the receiver 3 in which it separates into two phases, of which the aqueous phase is withdrawn. The ester phase is recycled to the base of the extraction column 1 by line 4; sufficient ester is returned by line 5 to the distillation column 2 as reflux to ensure that substantially all of the water is removed in the overhead fraction.

The invention is illustrated further with reference to the following example.

*Example*

Aqueous acrylic acid containing acetic acid, 4.6% and acrylic acid 15.6% by weight was fed to the head of a rotating disc extractor at the rate of 1150 parts per hour. Ethyl acetate was fed to the base of the column at the rate of 1150 parts per hour and gave an oil product 1460 parts per hour containing by volume, weight acrylic acid, 13.0%; acetic acid, 3.3%; ethyl acetate, 75.7%; water, 8.0%. The raffinate contained by weight acrylic acid, 0.1%; acetic acid, 0.6%; ethyl acetate, 7.0% and water, 92.3%.

The oil product from the extraction was fed to a still packed with helices and operating under reduced pressure. At a kettle temperature of 85° and reflux ratio of 3.5 the kettle product 633 parts consisted of by weight low boilers, 0.7%; acetic acid, 24.8%, propionic acid, 0.2%, acrylic acid, 69.5%; water, 3.9%. The distillate oil phase 2110 parts contained by weight ethanol, 1.7%, ethyl acetate, 90.3%; ethyl acrylate, trace; acetic acid, trace; water, 8.0%. The distillate water phase 335 parts contained by weight ethanol, 3.2%; ethyl acetate, 10.6%; ethyl acrylate, 0.1%; acetic acid, 0.1%; water, 86.0%.

We claim:

1. A process for the concentration of aqueous acrylic acid solutions which comprises extracting the aqueous acrylic acid with a substance selected from the group consisting of ethyl acrylate and ethyl acetate whereby the acrylic acid is extracted into the ester phase, fractionally distilling the ester phase under reduced pressure to separate the ester as an overhead azeotropic fraction with substantially all of the water, recovering dry concentrated acrylic acid from the base of the column, and maintaining sufficient ester in the column to ensure that substantially all of the water is removed in the overhead fraction.

2. A process as claimed in claim 1 wherein the aqueous acrylic acid solution contains about 10–30% by weight of acrylic acid.

3. A process as claimed in claim 2 wherein the aqueous solution contains about 15–25% by weight of acrylic acid.

4. A process as claimed in claim 1 wherein the extraction is carried out in a counter-current manner.

5. A process as claimed in claim 1 wherein during the fractional distillation the ester is returned to the column as reflux to ensure removal overhead of substantially all the water present.

6. A process as claimed in claim 5 wherein the overhead azeotropic fraction is condensed, separated into the aqueous and ester phase and part of the ester phase returned to the column as reflux.

7. A process as claimed in claim 6 wherein the remainder of the ester phase is recycled to the extraction stage.

8. A process as claimed in claim 1 wherein the aqueous acrylic acid solution is obtained by cooling of the effluent gases resulting from the catalytic vapour phase oxidation of propylene with water.

9. A process as claimed in claim 8 wherein the dilute aqueous acid solution contains acetic acid in addition to acrylic acid.

References Cited

UNITED STATES PATENTS

| | | | |
|---|---|---|---|
| 1,668,380 | 5/1928 | Richard | 203—15 |
| 1,915,002 | 6/1933 | Richard et al. | 203—15 |
| 2,159,146 | 5/1939 | Guinot | 203—60 |
| 2,269,163 | 1/1942 | Othmer | 203—16 |
| 2,333,756 | 11/1943 | Wentworth | 203—16 |
| 2,395,010 | 2/1946 | Othmer | 203—60 |
| 3,264,347 | 8/1966 | Sannewald et al. | 260—486 |

NORMAN YUDKOFF, *Primary Examiner.*

WILBUR L. BASCOMB, Jr., *Examiner.*